US012345062B2

(12) United States Patent

Chambers et al.

(10) Patent No.: US 12,345,062 B2

(45) **Date of Patent: *Jul. 1, 2025**

(54) HIGH-INTENSITY, TELESCOPING LIGHT TOWER WITH SAFETY FEATURES

(71) Applicant: WCHAMBE INVESTMENT, L.L.C., Baton Rouge, LA (US)

(72) Inventors: Walter Chambers, Baton Rouge, LA (US); Todd Chambers, Baton Rouge, LA (US); Layne Yander, Gonzales, LA (US)

(73) Assignee: WCHAMBE INVESTMENTS, LLC, Baton Rouge, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/733,202

(22) Filed: Jun. 4, 2024

(65) Prior Publication Data

US 2024/0318453 A1 Sep. 26, 2024

Related U.S. Application Data

(63) Continuation of application No. 18/310,028, filed on May 1, 2023, now Pat. No. 12,018,502, and a continuation of application No. 18/130,047, filed on Apr. 3, 2023, now Pat. No. 12,000,164, said application No. 18/310,028 is a continuation of application No. 17/844,452, filed on Jun. 20, 2022, now Pat. No. 11,639,610, which is a continuation of application No. 17/124,744, filed on Dec. 17, 2020, now Pat. No. 11,365,555, which is a continuation of application No. 16/787,252, filed on Feb. 11, 2020, now Pat. No. 10,871,004, which is a continuation of application No. 16/552,190, filed on Aug. 27, 2019, now Pat. No. 10,557,279, which is a continuation-in-part of application No. 15/481,222, filed on Apr. 6, 2017, now Pat. No. 10,393,324.

(60) Provisional application No. 62/320,057, filed on Apr. 8, 2016.

(51) Int. Cl.

| | |
|---|---|
| ***E04H 12/18*** | (2006.01) |
| ***F21L 4/02*** | (2006.01) |
| ***F21V 21/30*** | (2006.01) |
| ***F21W 131/10*** | (2006.01) |

(52) U.S. Cl.

CPC .............. *E04H 12/182* (2013.01); *F21L 4/02* (2013.01); *F21V 21/30* (2013.01); *F21W 2131/10* (2013.01)

(58) Field of Classification Search

CPC .......... E04H 12/182; F21L 4/02; F21V 21/30; F21W 2131/10

See application file for complete search history.

(56) References Cited

U.S. PATENT DOCUMENTS 10,393,324 B1 * 8/2019 Chambers ............. E04H 12/182
10,871,004 B2 * 12/2020 Chambers ............... F21V 21/30
(Continued)

*Primary Examiner* — Mary Ellen Bowman

(74) *Attorney, Agent, or Firm* — Roy Kiesel Ford; DOODY & NORTH, APLC

(57) ABSTRACT

A mobile lighting device is disclosed with extendable boom sections. The boom sections are stored in a horizontal position and then pivot to a vertical position before being extended upward. A light section is positioned at the uppermost end of the last extendable boom section. A variety of safety features are also disclosed.

14 Claims, 11 Drawing Sheets

(56) References Cited

U.S. PATENT DOCUMENTS

| | | | | |
|---|---|---|---|---|
| 11,639,610 | B2 * | 5/2023 | Chambers | F21L 4/02 362/486 |
| 12,018,502 | B2 * | 6/2024 | Chambers | E04H 12/182 |

* cited by examiner

Auto Boom Lock

HIGH-INTENSITY, TELESCOPING LIGHT TOWER WITH SAFETY FEATURES

CROSS REFERENCE TO RELATED APPLICATION

This application claims benefit of U.S. patent application Ser. No. 18/130,047, filed on Apr. 3, 2023, now U.S. Pat. No. 12,000,164, which claimed benefit of U.S. patent application Ser. No. 17/844,452, filed on Jun. 20, 2022, and is now U.S. Pat. No. 11,639,610, which in turn claimed the benefit of U.S. patent application Ser. No. 17/124,744, filed on Dec. 17, 2022, and which issued as U.S. Pat. No. 11,365,555 on Jun. 21, 2022, which in turn claimed the benefit of U.S. patent application Ser. No. 16/787,252, filed Feb. 11, 2020, and issued as U.S. Pat. No. 10,871,004 on Dec. 22, 2020, which in turn claimed the benefit of U.S. patent application Ser. No. 16/552,190, filed on Aug. 27, 2019, and which issued as U.S. Pat. No. 10,557,279 on Feb. 11, 2020, which in turn claimed the benefit of U.S. patent application Ser. No. 15/481,222, filed Apr. 6, 2017, and which issued as U.S. Pat. No. 10,393,324 on Aug. 27, 2019, and which in turn claimed the benefit of U.S. Prov. Appln. No. 62/320,057, filed Apr. 8, 2016, each of which are hereby incorporated by reference in their entirety.

BACKGROUND OF THE INVENTION

Field of the Invention

The invention is in the field of outdoor, mobile lighting. In particular, the invention is directed to a high-intensity mobile lighting unit having certain safety features.

SUMMARY OF THE INVENTION

High-intensity mobile lighting systems are used in a variety of situations. It is common, for example, to see such systems on large construction sites like hydroelectric damn projects, in order to allow work to proceed safely at night. These systems may also be found at various outdoor activities, such as concerts, festivals and the like. Some outdoor sporting events use these types of lighting systems, either as a sole source of lighting, or to supplement fixed lighting systems. Other construction or industrial operations may also use these systems. If a powered light source is needed where there is no existing, fixed lighting system, or where the fixed lights are inadequate, a high-intensity mobile system is beneficial.

These mobile lighting systems typically require substantial electric power because of the powerful lights used. Generators are perhaps most frequently used to provide the needed electrical power, because generators are mobile and can be mounted on the same structural body as the lighting system. Many mobile lighting systems are in common use—for example, the type often seen on remote strip mining sites—rely on generators for power. An external source of electrical power—often referred to as "shore power"—also may be used to provide power to these lighting systems. Some newer mobile lighting systems use LED lights, which use much less power. Such a system might be powered by solar panels.

Many of the mobile, high-intensity lighting systems in use have the lights mounted on a boom. Such a boom is typically kept in a roughly horizontal position when the system is not in use or during transport. Such systems are often mounted on trailers, which allow for easy transport of the system. A typical system of the type just described, would be secured in an operating location, perhaps using ground jacks or other means. The boom would then be raised to a roughly vertical position, so that the lights are raised. The power supply would be activated (generator, shore power, or other), and the lights would be turned on.

These types of lighting systems are widely used and serve their purposes. Most have a few lights, and a boom of ten to fifteen feet. This type of lighting system is reasonably stable and simple to build and operate. It will effectively light a somewhat small area, and as a result, multiple units of this type are often needed to light a larger area. The need for multiple units increases the cost and complexity of the operation, and might require multiple workers to operate and oversee the lighting systems. In some situations, there may be limited locations that can support a mobile lighting system (e.g., refinery turnarounds, LNG new construction and other massive construction site projects).

When there is a need for a great deal of light from a small number of sources, the typical mobile lighting systems do not work well. What is needed is a mobile lighting system with much more lighting capacity positioned in a way that will light a much larger area. To achieve this result, the lighting system needs numerous lights and those lights must be raised to a far greater height than fifteen feet. Lighting towers, 80' and 100' or more would provide the coverage needed. Such towers, however, pose numerous challenges.

A mobile lighting system with an 80' and 100' or longer boom must be capable of storing the boom in more compact form. It is not practical to have a mobile light tower with a 80' and 100' or longer boom that is always fully extended. Such a tower could not be moved in the vertical position, and in the horizontal position, such a tower would be unduly long and unwieldy. There is a need for some structure that allows the light tower to be stored in a more compact manner.

A light tower of 80' and 100' or more with a large number of lights produces a large "sail" area high above its base. The large number of lights results in a large surface area. Wind acting on such a large area can generate very large forces. With a long tower (i.e., 80' and 100' or more), these forces can create extremely large torque at their base. There is a need, therefore, to protect such systems from high winds.

A light tower of 80' and 100' or more requires more precise vertical alignment than a shorter tower. The base for these long towers may need additional supporting structure. Such a tower might also benefit from a precision system for achieving vertical alignment. Some structure may be needed to effectively lock the tower boom into position once it is vertical.

The present invention provides these needed features. A telescoping light tower is disclosed with multiple sections housed within one another. In a preferred embodiment, there are four boom sections: the outer, first, or primary boom is 10" in diameter, the second section is 8" in diameter, the third section is 7" in diameter, and the last boom section is 6" in diameter. These boom sections can be extended to produce a very long lighting tower. Towers of 100' or more are possible with the present invention, and towers of 60' or more may benefit, as well.

A wind speed sensor using detectors mounted near the lights may be used to detect dangerous high speed wind conditions. When wind speeds are above a preselected set point, the extended boom sections could be automatically lowered to reduce the risk of wind damage.

Other safety features are disclosed that ensure the boom sections remain extended while the lighting system is in use.

Additional features allow the lifting force to disengage before the boom sections reach their limits in order to protect equipment from overload conditions. Locking mechanisms may be used to secure the main boom in the vertical position for operation and in the horizontal position for transport.

In a preferred embodiment, the present invention includes a base; a frame secured to the base; a pivot structure secured to the base and the frame; a primary boom section pivotably connected to the pivot structure; a first extendable boom section positioned within the primary boom section and configured to be extended from and retracted into the primary boom section; a means for pivoting the boom sections about the pivot structure; a means for extending and retracting the first extendable boom section; a means for securing the primary boom section in a vertical position; and, one or more safety features from the following group: a boom extension lock; a boom extension/retraction warning; a boom extension mechanical stop; a high wind speed sensor and automatic retraction system; and an automatic winch deactivation system configured to stop an extension/retraction winch when an extendable boom section is fully extended or fully retracted.

DETAILED DESCRIPTION OF THE INVENTION

Figure 1:
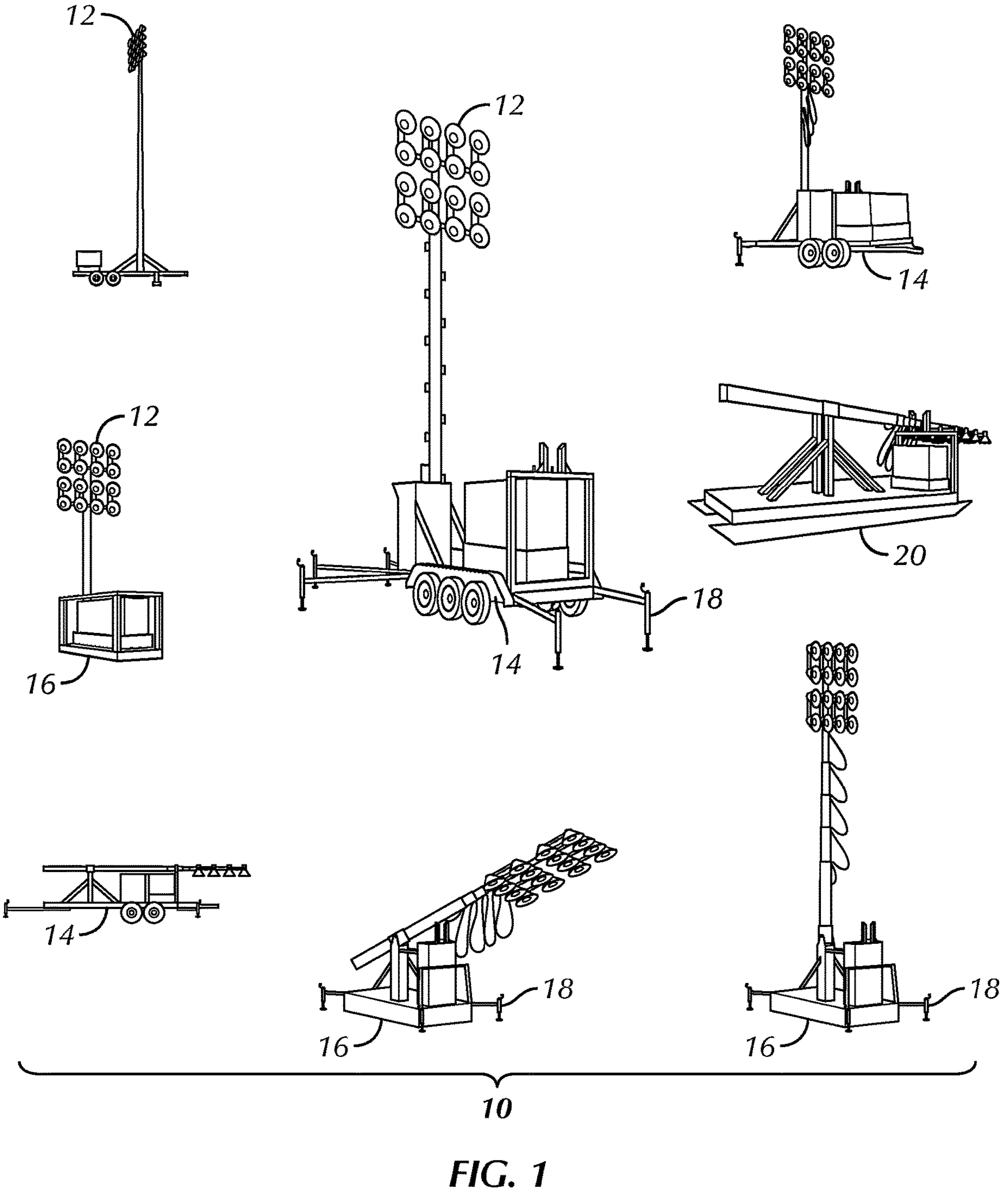
FIG. 1 shows illustrations of preferred embodiments of the present invention.

The present invention is best described by starting with general illustrations of some preferred embodiments. FIG. 1 shows of variety of embodiments of the mobile, high intensity, extendable light tower 10. These embodiments show of variety of different base configurations. In some embodiments, a trailer base 14 is used, having wheels and a hitch that can be connected to some type of towing vehicle. In another embodiment, a flat base 16 is shown which is designed to rest on the ground. Outriggers 18 are shown with some embodiments. A third embodiment includes a skid base 20, which can be dragged to a location. Each of these embodiments include lights 12 at the upper end of a boom.

Figure 2:
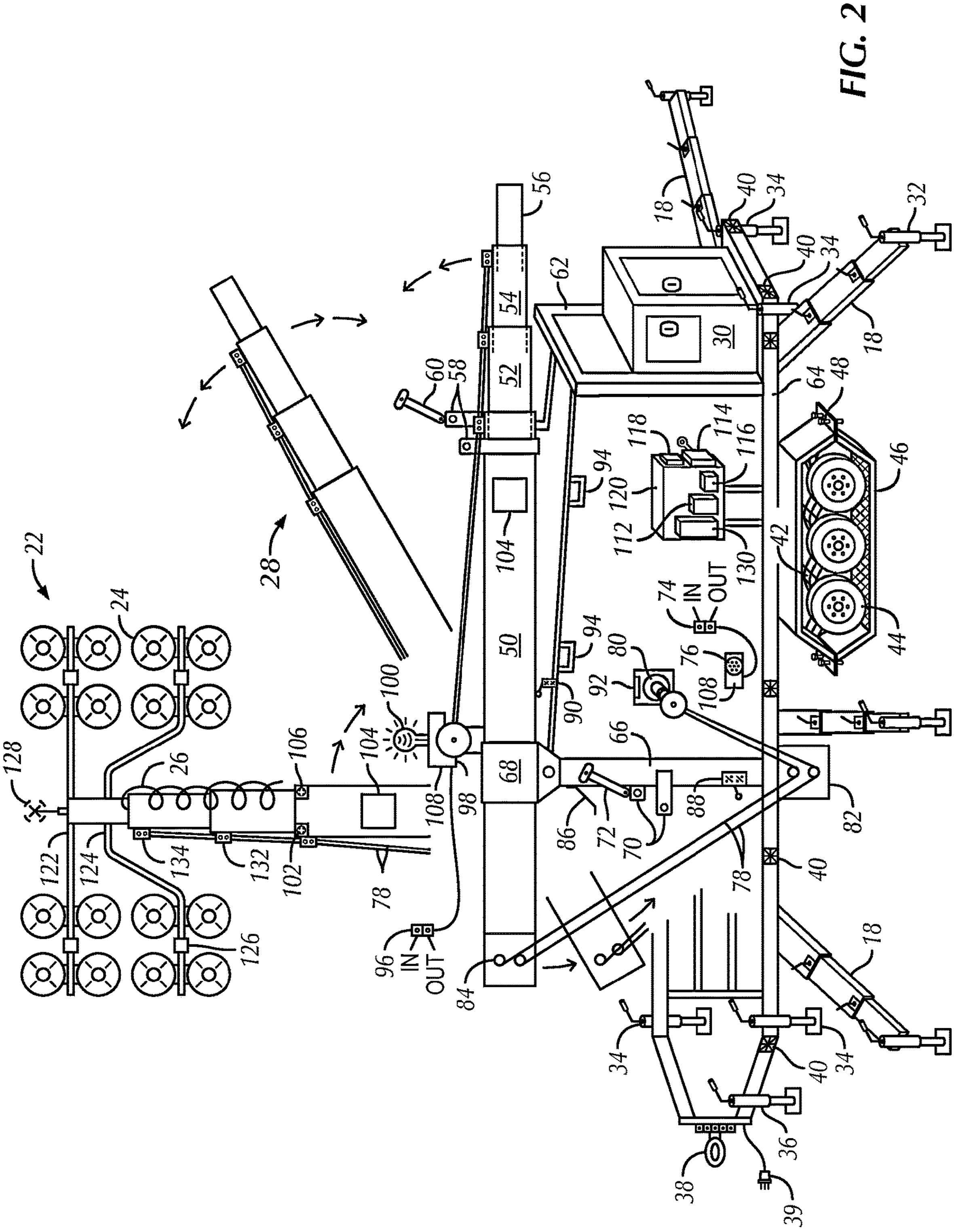
FIG. 2 is a front perspective drawing of the base and lighting sections of a preferred embodiment of the present invention.

FIG. 2 shows the primary features of the present invention mounted on a trailer platform. The mobile, high intensity, extendable light tower 10 is shown both in raised and lowered positions. The light section 22 is shown only in the raised position (i.e., it is omitted from the lowered positions to reduce the complexity of the drawing). A number of lights 24 make up the light section 22. A power cable 26 extends from the light section 22 to the base region of the system.

A generator 30 is shown on the base platform in FIG. 2. Outriggers 18 are also shown in this figure, and have outrigger ground supports 32. Stabilizer jacks 34 are mounted to the trailer base and are used to provide a solid foundation for the system. The stabilizer jacks 34 are used to ensure the light tower is vertical when in operation. Several basic trailer components are also shown in this figure, including a front trailer jack 36, a trailer hitch 38, trailer electrical cable 39, trailer lights 40, a trailer brake system 42, trailer tires 44, and fenders 46. Fender bolts 48 are used to connect the fender 46 to the trailer frame. This allows the fenders to be removed, inverted, and then used as a skid. This arrangement is shown in a later drawing.

The extendable booms of the present invention are also shown in FIG. 2, though only in retracted position. A primary boom section 50 is shown—it is 10 inches square in this embodiment. Within the primary boom 50 is housed an 8-inch boom 52, which houses a 7-inch boom 54, which houses a six-inch boom 56. This nested-boom structure is explained in more detail below. When stored for transport, the booms rest on a boom support frame 62, which is secured to the base frame 64. A boom horizontal cradle lock 58 surrounds the primary boom section in the stored position. A boom horizontal cradle lock pin 60 is used to lock the boom in the horizontal, stored position.

A tower pivot post 66 is securely mounted to the trailer frame and to the boom support frame 62. The boom sections pivot about a boom pivot member 68. When in the raised position, the booms are secured to the tower pivot post 66 by a boom vertical cradle lock 70 and a boom vertical cradle lock pin 72.

A pivot controller 74 is actuated to begin operation of the pivot winch 76, which uses a dual cable system 78. As the pivot winch 76 begins to spool in the cable, the cable goes through the pivot post pulley box 82, mounted at the lower end of the pivot post 66. The cable then extends through the primary boom pulley box 84. When the cable is retracted by the winch 76, it pulls the lower end of the boom section toward the base of the tower pivot post 66. When viewed from the side (as in FIG. 2), the booms are rotated counterclockwise when being raised from horizontal to vertical position. The boom vertical cradle lock 70 and pin 72 are used to secure the boom in the vertical position.

A number of safety features may be used to control the final positioning of the boom sections. Boom springs 86 can be used to slow the final positioning of the boom sections. A vertical stop limit switch 88, paired with a horizontal stop limit switch 90, can be used to deactivate the winch when the boom has reached the vertical or horizontal position. Winch heaters 92 can be used to warm the winch motor in cold operating conditions. Forklift pockets 94 are shown on the boom support frame 62. These allow the entire unit to be lifted and moved using a forklift.

Once the nested boom sections have been locked in the vertical position, the extendable booms may be raised. This operation begins by using the telescoping controller 96, which activates the vertical winch 98. A telescoping warning light 100 is also activated during this operation. A warning alarm or buzzer may also be used to warn any personnel in the area that the light tower is being raised. The process of extending the boom sections is explained in more detail below.

FIG. 2 also presents a number of other components found in a preferred embodiment of the invention. A winch control box 108 is shown. A main power switch 114 is shown near the light control box 112, which contains a lighting contactor 116 a daytime controller 118 and lighting ballast 120.

The light section 22 shown in FIG. 2 includes a 4-inch top lighting bracket 122 and a 4-inch bottom lighting bracket 124. A light electrical connection box 126, and a wind speed sensor 128 are also shown as part of the light section 22. A wind speed detector and controller 130 are positioned in the light control box 112. Finally, a pulley at the top of the 8-inch boom section 132 and a pulley at the top of the 7-inch boom section 134 are also shown in FIG. 2.

Figure 3:
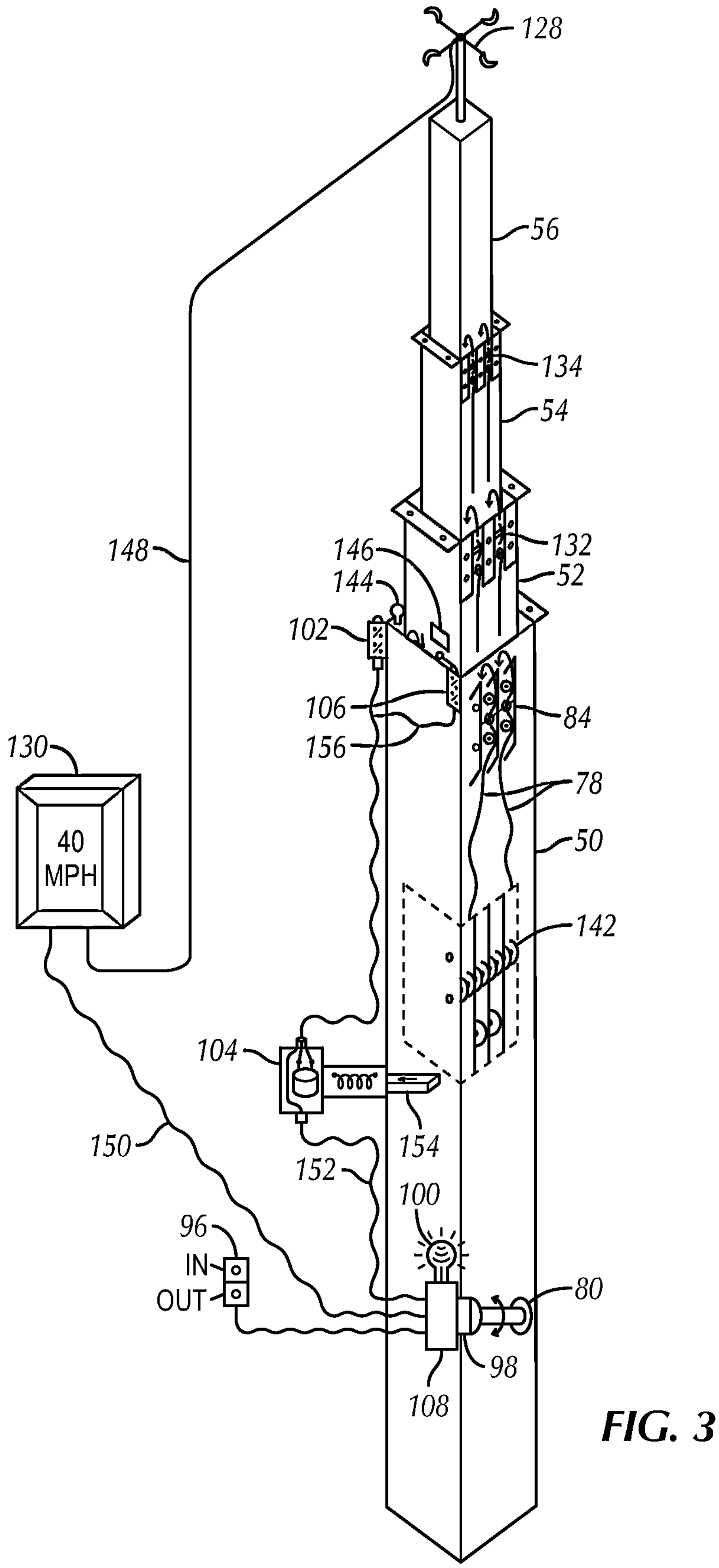
FIG. 3 is a perspective view of a telescoping boom section of a preferred embodiment of the present invention.

FIG. 3 shows the telescoping boom portion of a preferred embodiment of the present invention. In this embodiment, the length of the individual boom sections is selected to provide the ultimate height needed. Ten foot boom sections will produce a telescoping section of about 40' when fully extended. Twenty or twenty-five foot boom sections will produce an extended boom height of about 80' or 100'. The lighting section extends above the boom sections, and the boom sections are mounted on a base, so these two features raise the lights more than the extended length of the boom sections. A typical total height of the invention, for example with twenty foot boom sections would be 80'-100'. Twenty foot boom sections are a preferred embodiment, providing a total tower height of almost 100', which is higher than existing products and provides sufficient light for a large area.

The boom sections shown in FIG. 3 are raised to vertical position using the winch and cable process described in connection with FIG. 2, above, or using hydraulic lifting, as will be described below. The boom sections could be raised to the vertical position using any suitable means, even through use of an external crane or front-end loader, in the event such external lifting source is needed. Once locked into the vertical position, the boom sections may be extended upward. The present invention may use a winch and cable system or hydraulics to raise and lower the boom sections. Hydraulic stabilization jacks also may be used. The extension/retraction processes can be remote controlled from over 300' from tower. The stabilization jacks and other components may also be controlled remotely. This capability provides an added layer of safety for operators.

To extend the boom sections shown in FIG. 3, a telescoping controller 96 is actuated, which powers the vertical extension winch 98 that uses a dual cable system 78 that balances load on the winch drum. Two sets of cables are used in this preferred embodiment, with one on each side of the boom sections. When the boom extension process begins a telescoping warning light 100 is illuminated and a warning horn, alarm, or buzzer is sounded. These features are important because they alert others in the general area that a potentially dangerous operation is in process. Given the heights to which the boom sections may be extended, if the tower were to fall when extended, it could reach persons who are not particularly close to the tower base. Some type of alarm or warning system is preferred, and it is activated any time the boom sections are being extended or retracted.

The vertical extension winch 98 is secured to the base section or to the primary boom section 50, which is a 10" section in this embodiment. The cable system 78 extends up and down along each boom section. The second boom section 52 is 8" square in this embodiment. It has a pulley box 142 located near its lower end. This is shown in FIG. 3, though in operation, this pulley box would not be visible when the 8" boom section is retracted. Somewhat similar pulley boxes are located near the lower end of the 7" boom section 54 and the 6" boom section 56. It should be noted that the boom sections may be of different sizes, and the dimensions given here are merely exemplary and not limiting.

As the winch 98 is operated, the cable system 78 begins to wrap onto the double winch drum 80. The cables pass over pulleys near the top of each boom section and then through the pulley boxes like the 8" boom section pulley box 142 shown in FIG. 3. In the preferred embodiment shown, one upper pulley is shown with each of the extending boom sections: an upper pulley on the 8" boom section 132, and an upper pulley on the 7" boom section 134. In this embodiment, there are two of these pulleys near the top of each extending boom section, though only one can be seen in FIG. 3.

The cables pull each boom section up and can be configured to produce any desired sequence of boom section extension. The pulley boxes on each boom section can be configured to alter the lifting force generated. If an equal lifting force is applied to each boom section, the smallest boom section (i.e., the 6" boom section 56 in this embodiment) will be raised first because it weighs less than the larger boom sections. If configured in this way, the boom sections will extend from smallest to largest. This sequence may be altered by configuring the pulley boxes to exert different lifting forces to the different boom sections. It may be preferred, for example, to have the larger boom sections extend first. The chosen extension sequence is not a limitation of the present invention and may be altered to meet the needs or desires of particular applications.

The invention uses important safety features in connection with the extension of the boom sections. An alarm or warning system was mentioned above. In addition, a vertical up limit switch 102 is used to disengage the winch when the boom sections are fully extended. This reduces the stress load on the winch. A boom extension lock 104 is used with each boom section, and is activated when the boom section has been fully extended. The extension lock 104 is an electromechanical device in a preferred embodiment, and will be described in more detail in connection with FIG. 5 below. The device extends a locking cam 154 that prevents the fully-extended boom section from being lowered. This locking system is activated when each boom reaches its intended height, and is deactivated before the boom sections are retracted.

FIG. 3 also shows the wind speed sensor 128 and the wind speed detector/controller 130, which is set to 40 mph in this embodiment. The sensor 128 feeds a signal to the detector/controller 130. If the detected speed reaches a pre-selected set point (e.g., 40 mph), the boom sections are automatically retracted to prevent wind damage to the lighting system. A wind speed sensor cable 148 is shown as is a wind speed control cable 150, where the latter cable is shown in connection with the winch 98. This system is connected through the control system for the telescoping operations. In addition, the wind speed components of the present invention may be configured to sound a high-wind warning at a set point somewhat below the point at which automatic retraction is activated. This would warn operators that high winds are occurring and that the system may be retracted due to such winds. This would allow workers time to secure any critical operations before they lose lighting.

FIG. 3 also shows a group of mechanically operated limit switches. The up limit switch 144 is used to stop the winch 98 when the boom sections have been fully extended. The down limit switch 146 stops the winch when the boom sections have been fully retracted. Wiring cables 152 for these limits switches and for the alarm/warning system are shown collectively in FIG. 3. Mechanical stops are also shown in FIG. 3 for each boom section. The mechanical stops are a redundant form of protection to ensure the boom sections cannot be extended beyond the intended range.

The mechanical stops on each boom section engage with a mechanical stop clip on each larger-sized boom section. The 8" boom mechanical stop 162 would be physically stopped by the 10" boom section mechanical clip 168. The 7" boom mechanical stop 164 would engage with the 8" boom section mechanical clip 170. And finally, the 6" boom mechanical stop 166 would engage the 7" boom section mechanical clip 172.

Thus, the preferred embodiment shown in FIG. 3 shows key safety features of the present invention: the operation alarm/warning system, the high-wind protection, the limit switches to disengage and thus protect the winch, boom extension locks, and the redundant mechanical stops. These features combine to make the invention safe, while also allowing for a telescoping lighting system that can reach heights of 100' or more. Not every safety system shown must be used, but all provide certain types of protection. In the most preferred embodiment, all of the shown safety features would be used.

Figure 4:
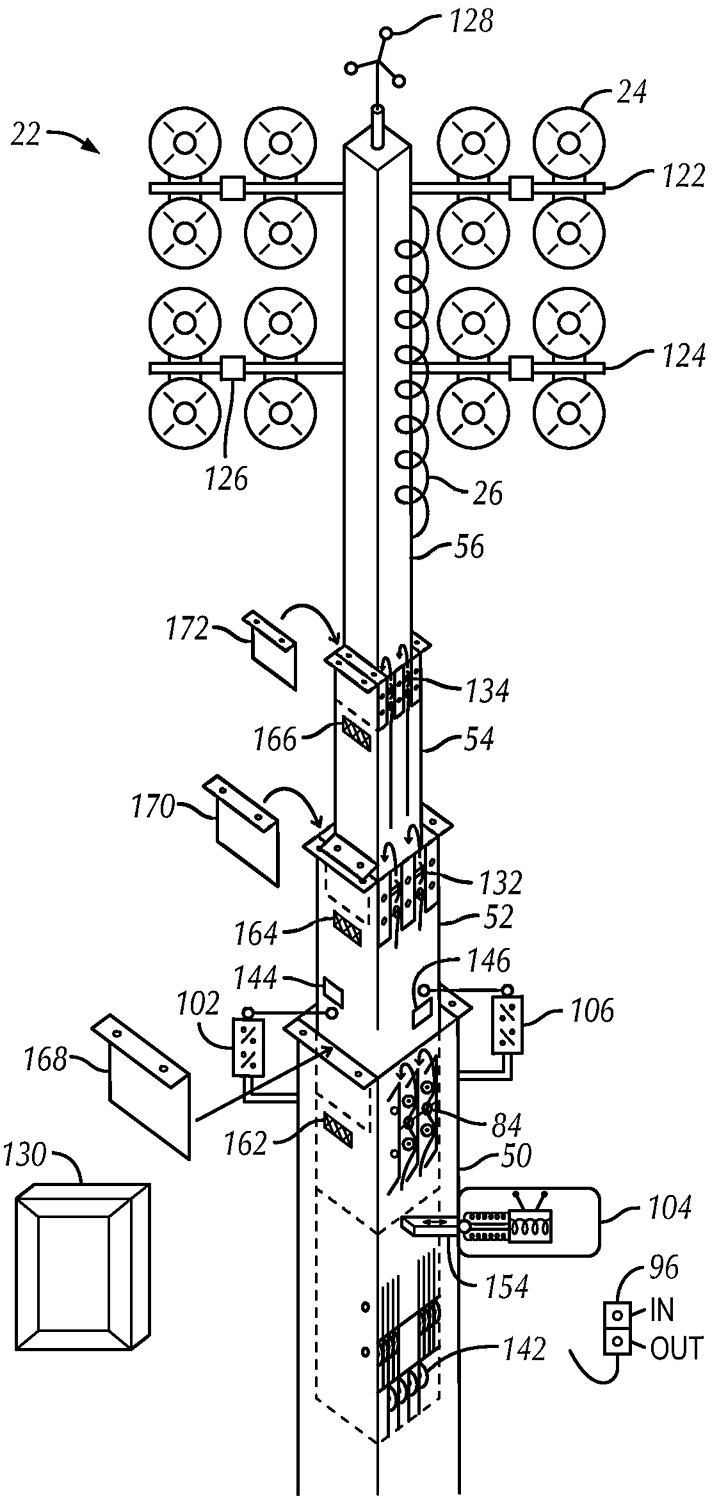
FIG. 4 is a perspective view of the upper boom and light sections a preferred embodiment of the present invention.

FIG. 4 shows the upper ends of the boom sections and the light section 22 of the invention. In this embodiment, the lights 24 consist of eight lights mounted on a 4" top lighting bracket 122 and eight additional lights on a 4" lower lighting bracket 124. A light electric connection box 126 is shown and would house the connections from the main power cable 26 to each light 24. The lighting brackets 122, 124 are mounted above the 6" boom section, and the wind speed sensor 128 is shown at the top of the lighting tower. The wind sensor 128 may be mounted in any position where it will be exposed to full wind conditions. It should not be mounted, however, where the large lights 24 are capable of blocking wind from reaching the sensor 128.

Several of the features described in connection with FIG. 3 are shown again in FIG. 4. These include the pulley box 142 of the 8" boom section 52. The primary 10" boom pulley box 84, the 8" boom section upper pulley 132, and the 7" boom section upper pulley 134 are shown. When the winch 98 (not shown in FIG. 4) is operated, the cable system 78 goes through the 10" boom pulley box 84, which is located near the top of the 10" boom section. The cable system 78 then extends down to the 8" boom section pulley box 142, which is located near the lower end of the 8" boom section. In this manner, when the cable system 78 is retracted by the winch 98, the 8" boom section 52 is lifted upward. Similar processes result in the lifting of the 7" boom section 54 and the 6" boom section 56. Note that no pulleys are required at the top of the 6" boom section.

FIG. 4 also shows the up and down limit switches and the mechanical stop features described above in connection with FIG. 3. The boom extension lock 104 is also shown here. These features serve the same purposes and work in the same way described above. It should be noted that the present invention could use more than four telescoping boom sections. Adding more boom sections will add more weight and more stress to the winch, cable, and pulleys. A four boom section system is preferred because it provides a good balance between working height and typical component capacities.

For example, in the embodiment shown in FIGS. 3 and 4, a 3,000 pound capacity winch may be used. When a block and tackle arrangement for the 8" boom pulley box 142 is used, the total lifting power of the winch can be increased. In a preferred embodiment, the lifting power is tripled to 9,000 pounds. Standard ¾" cable may be used, which typically has a working tensile strength of about 15,000 pounds. These components have been shown to work with 20' long boom sections of 10", 8", 7" and 6", as shown in these figures. Adding an additional boom section (e.g., a 5" section) would probably still fall within the working capacities of these components. Such variations are within the scope of the present invention.

Figure 4A:
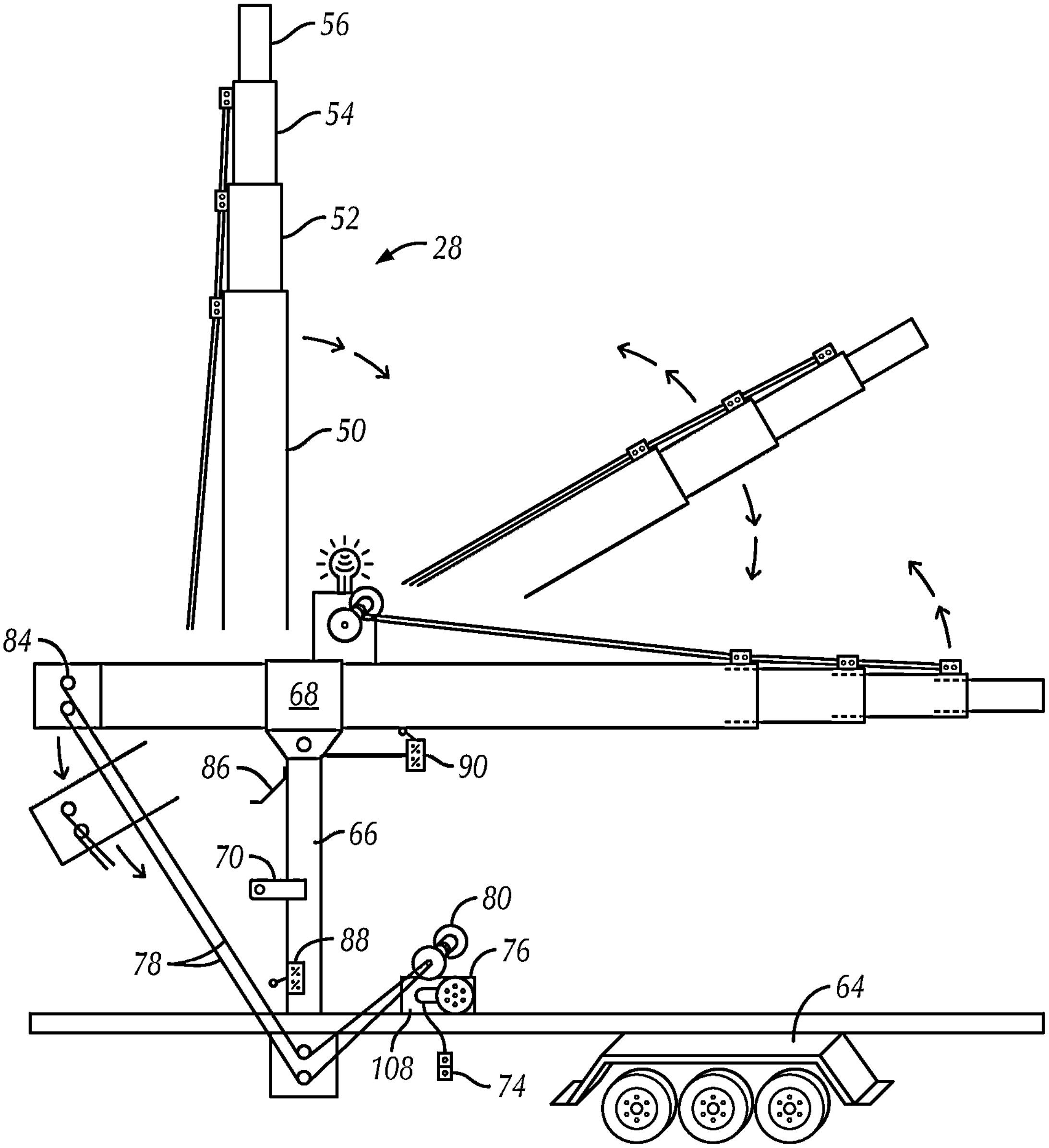
FIG. 4*a* shows the pivot system of a winch operated preferred embodiment of the present invention.

FIG. 4*a* shows a more close-up view of the transitioning of the boom section 28 from the horizontal, transport or storage position to the vertical, operating position. The boom section 28 is stored in a roughly horizontal position, and is secured using clamps, straps, locking pin and cradle (as shown in FIG. 2), or other appropriate means. In the horizontal position, with the extendable boom sections all retracted, the invention is typically about 10' in height, which allows it to be towed behind a vehicle without creating any special clearance concerns. This positioning is also stable and reduces wind resistance when transporting the unit.

Once the unit is in position for use, whatever means were used to secure it in the horizontal position are removed or disengaged, and the boom section 28 is then raised to the vertical position. It is then secured in the vertical position using clamps, straps, locking pin and cradle (as shown in FIG. 2), or other appropriate means. This operation is described above in connection with FIG. 2.

Figure 5:
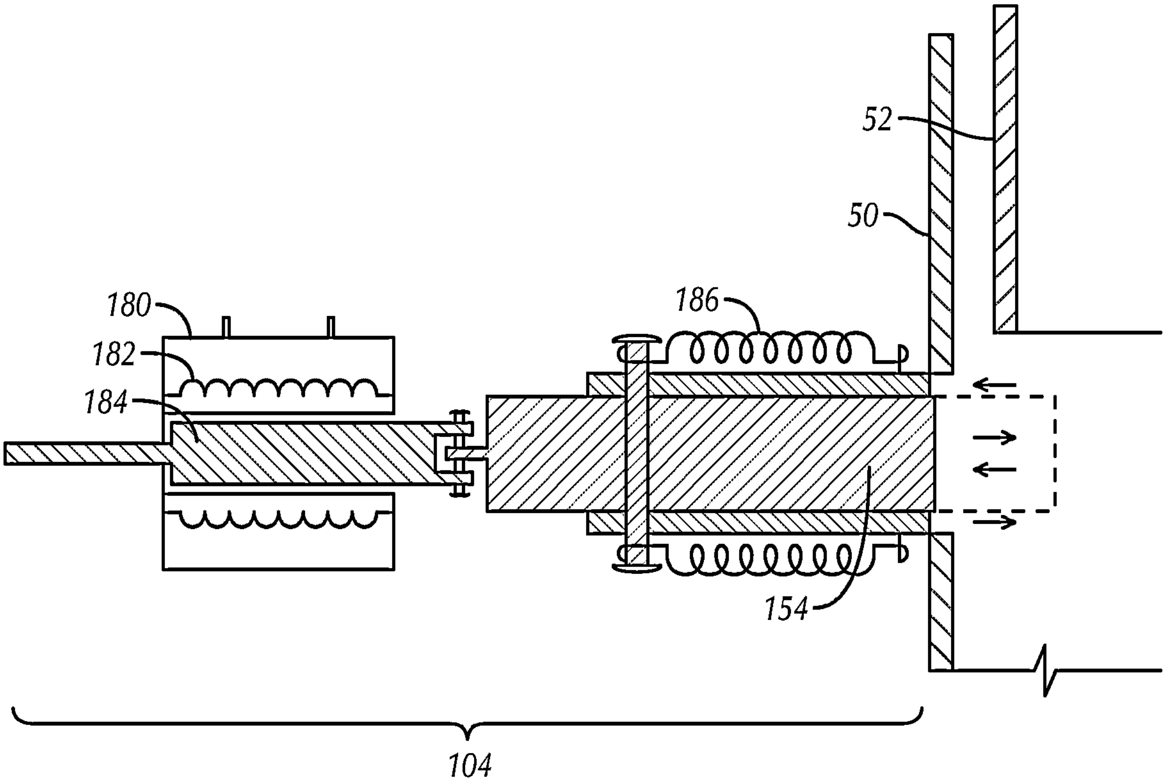
FIG. 5 shows an embodiment of a boom lock for the invention.

FIG. 5 shows the operation of a preferred embodiment of the boom extension lock 104. In this embodiment, an electro-mechanical mechanism is used. A solenoid 180, having a coil 182 and a plunger 184, is used to move the boom locking cam 154. A bias spring 186 is used to bias the mechanism to the engaged position. In FIG. 5, the mechanism is shown mounted on the 10" primary boom section 50, so that when used, it locks the 8" boom section in the fully extended position.

The bias spring 186 pulls the locking cam 154 inward, that is, toward the interior of the 10" boom section 50. The solenoid 180, when powered on, will pull the plunger 184, and thus the locking cam 186 outward. In other words, to hold the locking cam 186 in the disengaged position (i.e., the position shown in FIG. 5), the solenoid must be powered on. The mechanism could easily be designed in the reverse of the configuration shown in FIG. 5—that is, with the bias spring tending to keep the locking cam 154 disengaged and the solenoid 180 being powered on to engage the lock. The arrangement shown in FIG. 5 is preferred because it is a fail-safe configuration. Upon a loss of power to the solenoid, the locking cam 154 will engage, or at least will remain pressed against the outer surface of the inner boom section. In this condition, the boom extension lock 104, will automatically lock a fully extended boom section, and will only disengage when power is supplied to the solenoid 180. When the inner boom section is fully extended, and the locking cam 154 is extended inwardly, the cam 154 will block the boom section from being retracted, or from free-falling. The engaged position of the locking cam 154 is shown in dashed lines on FIG. 5.

During normal operations, the boom extension lock 104 operates automatically in preferred embodiments. The solenoid 180 is powered on as the boom sections are raised. When a particular boom section reaches its fully extended position, a limit switch is actuated, and this switch then results in the power being removed from the solenoid 180. The locking cam 154 is then extended inwardly by the force of the bias spring 186, and locks the boom section in the fully extended position. When the boom sections are retracted, the same system will automatically supply power to the solenoid 180, causing the locking cam 154 to be pulled outward, which allows the boom sections to be retracted (i.e., lowered).

Figure 6:
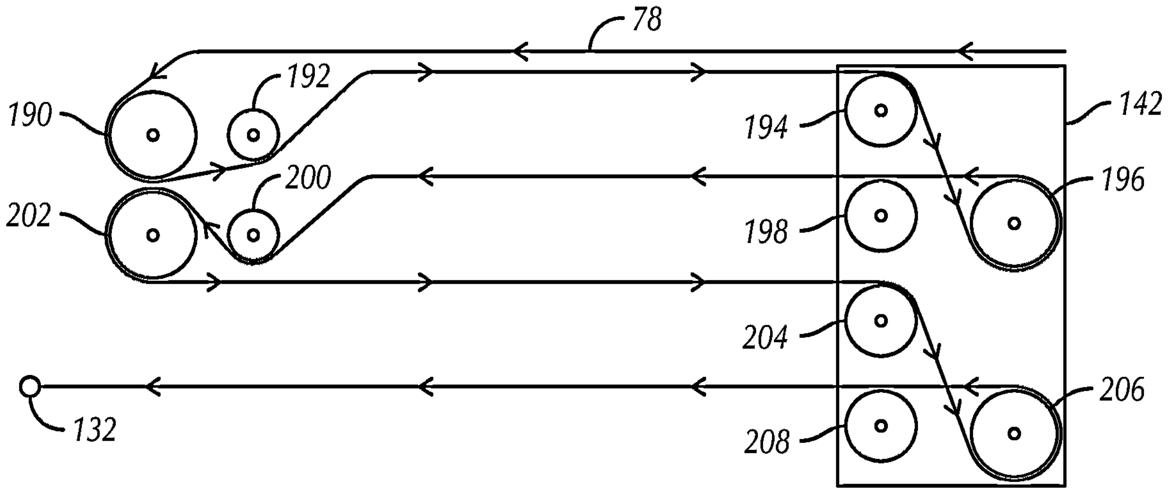
FIG. 6 is a diagram of a cable and pulley arrangement used m a preferred embodiment of the present invention.

FIG. 6 shows one configuration for the pulley box 142. In this embodiment, one line of the dual cable system 78 passes over 6" pulley 190, then 5" pulley 192, 4" pulley 194, and then around 6' lower pulley 196. The cable then passed over 4" guide pulley 198, under 5" upper pulley 200, and around 6" upper pulley 202. The cable then goes over 4" lower pulley 204, around 6" lower pulley 206 and over 4" guide pulley 208 before leaving the pulley box 142 toward the upper pulley on the 8" boom section 132. This arrangement creates a block-and-tackle configuration with a mechanical advantage of four. Different arrangements can be used to either increase or decrease the mechanical advantage. With a lower mechanical advantage, the winch will extend and retract the boom sections more quickly, but greater winch power will be needed. The configuration shown in FIG. 6 provides sufficient mechanical advantage for the preferred embodiments described above.

Figure 7:
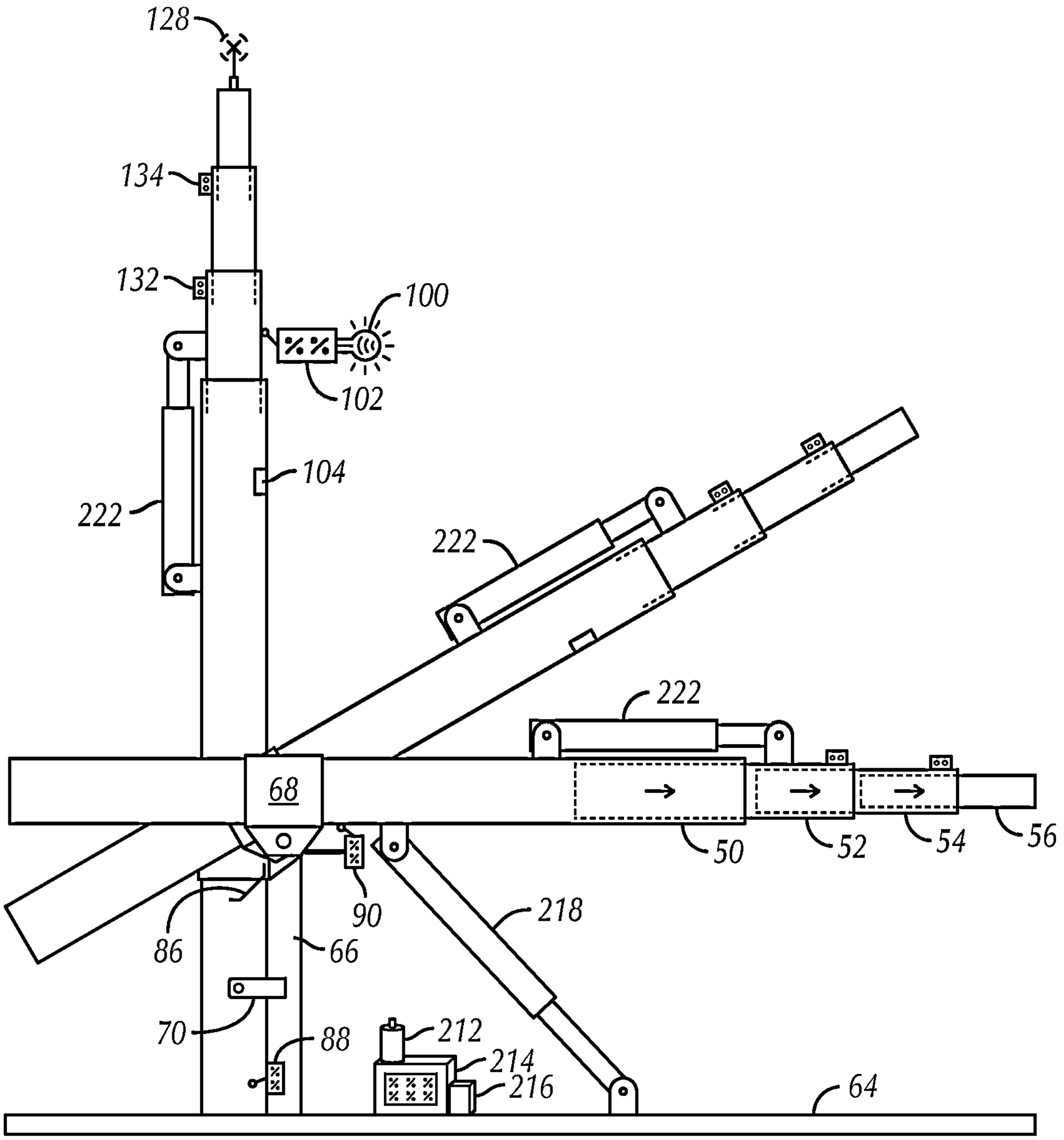
FIG. 7 is a diagram of switch and relay components of a preferred embodiment of the present invention.

A hydraulic-powered embodiment is shown in FIG. 7. A hydraulic fluid tank 212 supplies fluid to a hydraulic pump 216, which sends pressurized fluid to the hydraulic cylinders. A control station 214 is used to actuate the appropriate cylinders. A pivot cylinder 218 is used to move the boom sections from horizontal to vertical position and vice versa. Once the boom sections are locked into vertical position, one or more telescoping cylinders 222 may be used to extend and retract the boom sections. Only one telescoping cylinder is shown in FIG. 7, but there may be separate cylinders for each of the extendable boom sections. In addition, the stabilizer jacks 34 (not shown in FIG. 7) may also be powered by the hydraulic system.

A hybrid cable/hydraulic system is also possible for the invention. The hydraulic pivot cylinder 218 could be used to pivot the boom sections to and from the vertical position, and a winch system like that described above could be used to extend and retract the boom sections. Or hydraulics could be used to extend and retract the boom sections, while a winch is used to pivot the boom sections. These operations may be controlled from a remote location using any conventional type of remote control technology.

In addition, a lighting tower in accordance with the present invention could be controlled and operated from a location completely remote from the operating site using Internet, satellite transmission, or other means of communication over long distances. This capability would allow for the present invention to be used in areas that may not be accessible or hospitable to workers. Such locations might include radioactive sites or sites in extreme cold. The present invention could be paired with a remotely steerable unit to move the light tower into position, and then the control systems described herein could be used to operate the light system. All such configurations are within the scope of the present invention.

Figure 8:
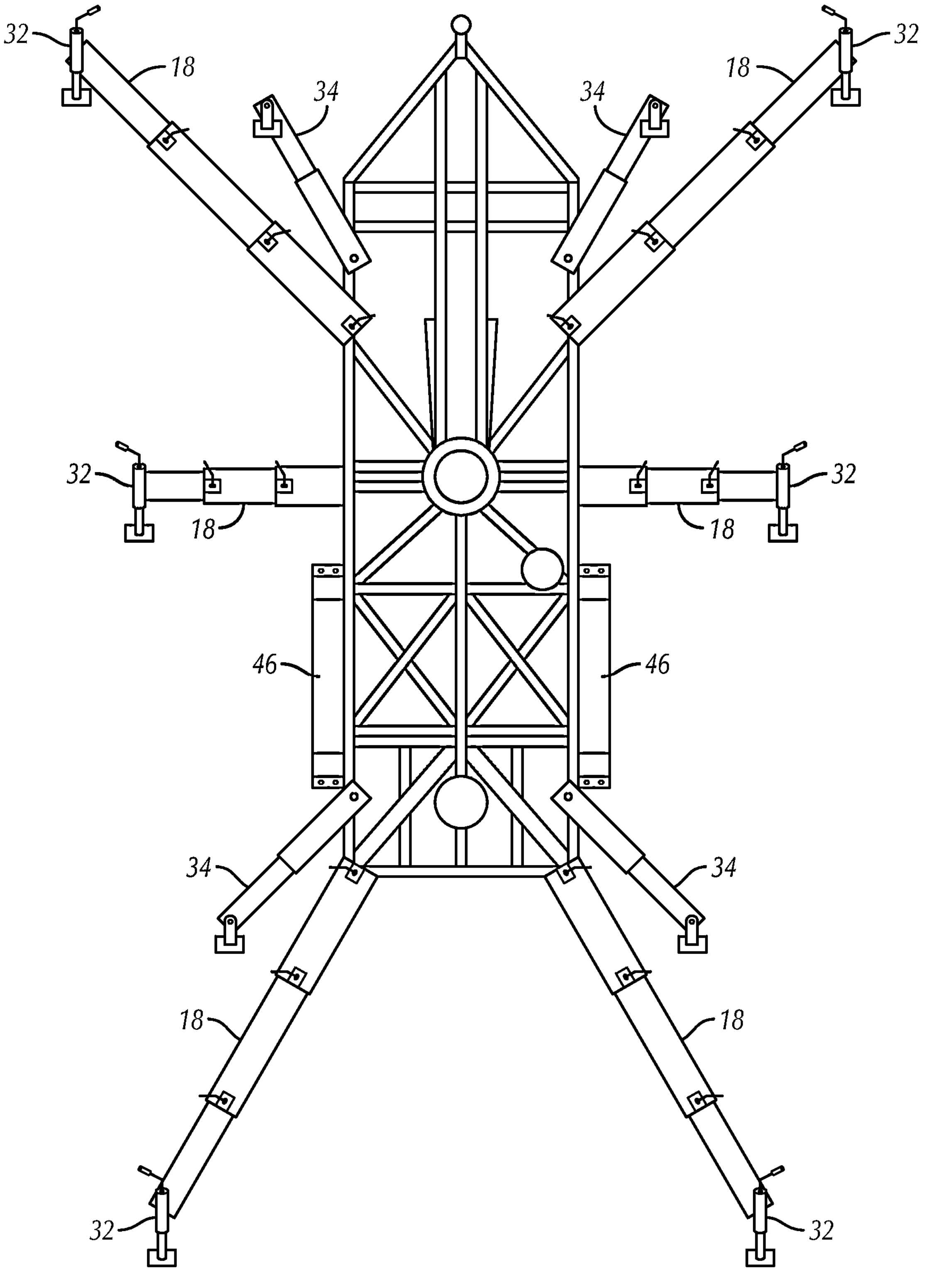
FIG. 8 shows a hydraulically powered pivot system of a preferred embodiment of the present invention.

FIG. 8 shows a top view of a trailer base 14 with base frame 64, but without the upper components. Outriggers 18 are shown with their respective ground supports 32. Stabilizer jacks 34 are used to secure the base and to ensure the boom sections (not shown) are in vertical alignment before being extended. A trailer hitch 38 and the fenders 46 are also shown.

Figure 9:
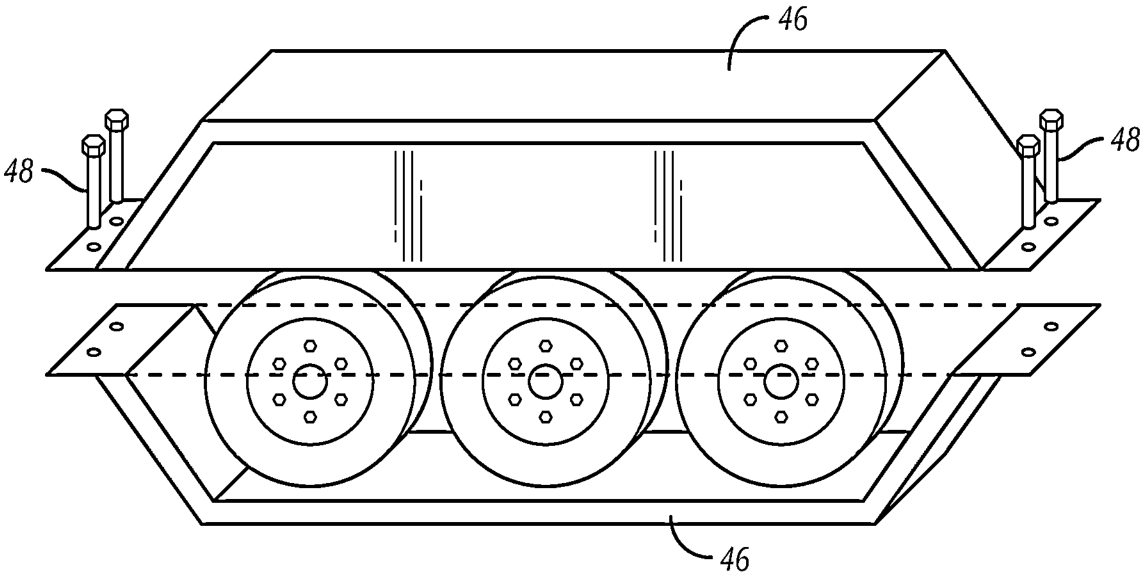
FIG. 9 is a top view showing outriggers of a base of a preferred embodiment of the present invention.

The reversible fenders 46 of the present invention are shown in more detail in FIG. 9. The fender bolts 48 are used to secure the fenders to the base frame 64 (not shown). This allows the removal of the fenders 46, which may be turned over and positioned below the wheels. The reversed fenders 46 and then reattached using the bolts 48, and now serve as a skid, allowed the base to be pulled over flat ground where the wheels might become stuck.

Figure 10:
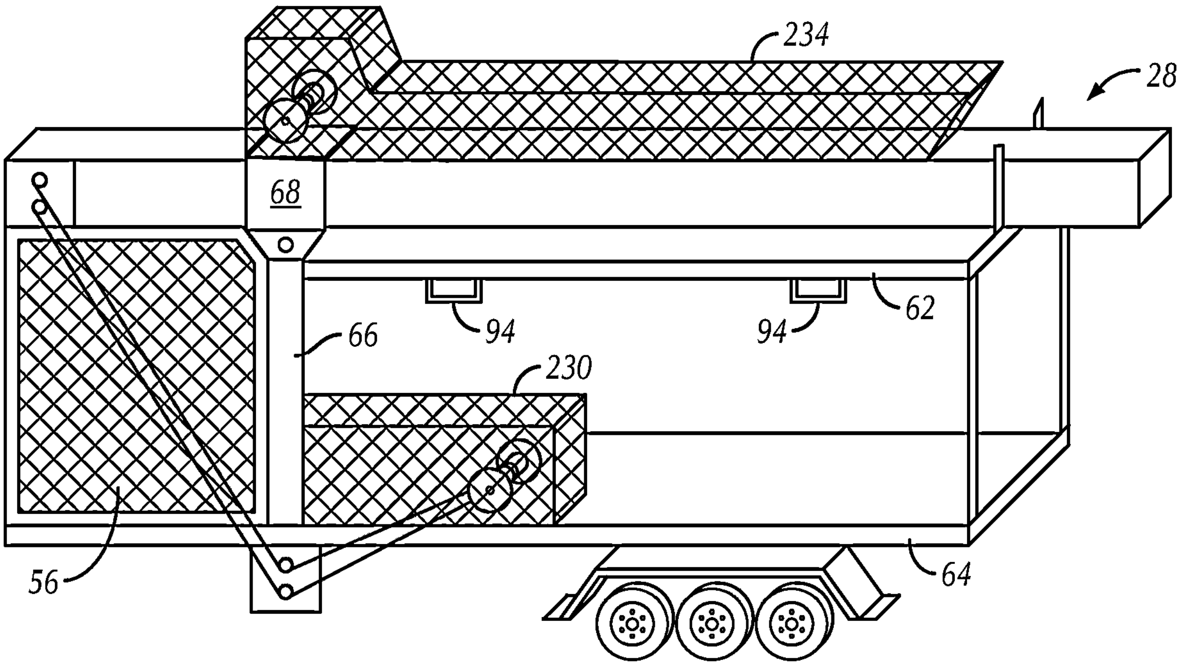
FIG. 10 shows an inverted fender skid structure of a preferred embodiment of the present invention.

The final drawing, FIG. 10, shows a series of protective screen guards. The winch guard 230 covers the working area of the lower winch assembly and protects personnel in the event a cable breaks or otherwise becomes free from the winch. A pivot assembly guard covers the areas of the boom sections 28 that pivot when the sections are moved from horizontal to vertical and back. Finally, a boom guard 234 covers the winch and cables on the exposed area of the boom sections. Similar guards may be used with the hydraulic-powered embodiments, with guards positioned around the key hydraulic components (not shown in FIG. 10.).

The preceding description is provided to illustrate certain preferred embodiments of the present invention. This description is not limiting and persons with skill in the art will recognize the existence of other variations on the structures and methods described above. All such variations, to the extent they are consistent with the preceding description and the following claims, are intended to be within the scope of the invention set forth in this patent.

What is claimed is:

1. An extendable light tower comprising:

a. a mobile trailer having a frame;

b. a tower post mounted to the frame;

c. a primary boom pivotally mounted to the tower post;

d. one or more extension booms nested within the primary boom;

e. a power source;

f. a pivot winch system comprising a pivoting winch electrically connected to the power source and operatively attached to the primary boom by cables, g. a pivot controller operatively attached to the pivoting winch and the power source, whereby activating the pivot controller will cause the primary boom and the one or more extension booms nested in the primary boom to be raised to a vertical position;

h. a vertical winch system comprising a vertical winch electrically connected to the power source and operatively attached to the one or more extension booms by cables;

i. a telescoping controller operatively attached to the vertical winch and the power source, whereby activating by the telescoping controller will cause the one or more extension booms nested in the primary boom to extend;

j. a light section comprising one or more array of lights affixed to one of the one or more extension booms configured to be the uppermost of the one or more extension booms when the primary boom and the one or more extension booms are in the vertical position and all of the one or more extension booms are extended, the light section electrically connected to the power source; and i. a vertical stop limit switch operatively connected to a vertical stop limit relay and further operatively connected to the pivot winch system, wherein the vertical stop limit switch is positioned to be activated when the primary boom is in the vertical position and wherein the vertical stop limit switch will deactivate the pivot winch when the vertical stop limit switch is activated.

2. The extendable tower according to claim 1 wherein the trailer frame is mounted on a wheel and axle assembly and the tower post is vertically affixed to the trailer frame.

3. The extendable tower of claim 1 further comprising fenders configured to be adjustably secured to the trailer frame over the wheels or under the wheels to act as skids.

4. The extendable tower of claim 1 further comprising a spring mounted to the tower post in a position to contact and apply pressure to the primary boom as it is raised into the vertical position.

5. The extendable tower of claim 1 further comprising a safety means for providing a warning when the extension booms are being raised, wherein the safety means is selected from the group consisting of a warning alarm, a warning light, and combinations thereof, and wherein the safety means is configured to be activated when the vertical winch is activated.

6. The extendable tower of claim 1 further comprising a wind speed sensor operatively attached to a warning device selected from the group consisting or a warning light, a warning alarm, or combinations thereof, wherein the warning device is configured to provide a warning when the wind velocity at the light section exceeds a predetermined level.

7. An extendable tower comprising:

a. a mobile trailer having a frame;

b. a tower post mounted to the frame;

c. a primary boom pivotally mounted to the tower post;

d. one or more extension booms nested within the primary boom;

e. a power source;

f. a pivot winch system comprising a pivoting winch electrically connected to the power source and operatively attached to the primary boom by cables;

g. a pivot controller operatively attached to the pivoting winch and the power source, whereby activating the pivot controller will cause the primary boom and the one or more extension booms nested in the primary boom to be raised into a vertical position h. a vertical winch system comprising a vertical winch electrically connected to the power source and operatively attached to the one or more extension booms by cables;

i. a telescoping controller operatively attached to the vertical winch and the power source, whereby activating the telescoping controller will cause the one or more extension booms nested in the primary boom to extend;

j. a light section comprising one or more array of lights affixed to one of the one or more extension booms configured to be the uppermost of the one or more extension booms when the primary boom and all of the one or more extension booms are in the vertical position and all of the one or more extension booms are extended, the light section electrically connected to the power source to operate the lights; and k. a vertical up limit switch positioned and configured to be activated when the one or more extension booms are fully extended and wherein the up limit switch will deactivate the vertical winch when the up limit switch is activated.

8. The extendable tower of claim 7 further comprising a boom extension lock comprising:

a. a boom locking cam configured to lock the one or more extension booms in a fully-extended position;

b. a solenoid operatively connected to the boom locking cam, the solenoid configured to move the boom locking cam in a first direction when the solenoid is energized; and c. a biasing spring operatively connected to the boom locking cam and configured to move the boom locking cam in a second direction when the solenoid is not energized.

9. The extendable tower of claim 8 wherein the solenoid is configured to retract the boom locking cam when energized, and the biasing spring is configured to extend the boom locking cam when the solenoid is not energized.

10. The extendable tower of claim 7 wherein the up limit switch is configured to de-energize the solenoid when the one or more extension booms are fully extended.

11. The extendable tower of claim 7 further comprising a wind speed sensor operatively attached to a warning device selected from the group consisting or a warning light, a warning alarm, or combinations thereof, wherein the warning device is configured to provide a warning when the wind velocity at the light section exceeds a predetermined level.

12. An extendable light tower comprising:

a. a mobile trailer having a frame;

b. a tower post mounted to the frame;

c. a primary boom pivotally mounted to the tower post;

d. one or more extension booms nested within the primary boom;

e. an hydraulic system comprising an hydraulic fluid reservoir fluidly connected to a pump configured to deliver hydraulic fluid to a manifold having valves configured to control the flow of hydraulic fluid through the hydraulic system;

i. wherein the hydraulic system further comprises a first hydraulic cylinder fluidly connected to the manifold and operatively connected to the primary boom, wherein the first hydraulic cylinder is configured to pivot the primary boom from a horizontal position to a vertical position when the first hydraulic cylinder is pressurized; and ii. wherein the hydraulic system further comprises a second hydraulic cylinder fluidly connected to the manifold and operatively affixed to at least of one of the one or more extension booms nested in the primary boom, wherein the second hydraulic cylinder is configured to extend the at least one of the one or more extension booms into a vertical position when the second hydraulic cylinder is pressurized;

f. an hydraulic controller comprising a pivot controller configured to control pressurization of the first hydraulic cylinder and a telescoping controller configured to control pressurization of the second hydraulic cylinder;

g. a light section comprising one or more arrays of lights electrically connected to the power source and affixed to one of the extension booms configured to be uppermost among the one or more extension booms when the primary boom and the one or more extension booms are in the vertical position and all of the one or more extension booms are extended; and h. a vertical stop limit switch operatively connected to the first hydraulic cylinder and positioned to be activated when the primary boom is in the vertical position, wherein the vertical stop limit switch will deactivate the first hydraulic cylinder when the vertical stop limit switch is activated.

13. The extendable tower of claim 12 further comprising a wind speed sensor operatively attached to a warning device selected from the group consisting or a warning light, a warning alarm, or combinations thereof, wherein the warning device is configured to provide a warning when the wind velocity at the light section exceeds a predetermined level.

14. The extendable tower of claim 12 further comprising a safety means for providing a warning when the extension booms are being raised, wherein the safety means is selected from the group consisting of a warning alarm, a warning light, and combinations thereof, and wherein the safety means is configured to be activated when the hydraulic system is activated.

* * * * *